United States Patent [19]
Krishnan et al.

[11] Patent Number: 5,972,088
[45] Date of Patent: Oct. 26, 1999

[54] WATER-BASED GRAVURE PRINTING INK

[75] Inventors: Ramasamy Krishnan, Colonia; Marilyn C. Yamat; Sabino Apostol, both of Bergenfield, all of N.J.

[73] Assignee: Sun Chemical Corporation, Fort Lee, N.J.

[21] Appl. No.: 09/178,621

[22] Filed: Oct. 26, 1998

Related U.S. Application Data

[63] Continuation-in-part of application No. 08/977,531, Nov. 25, 1997, abandoned, which is a continuation-in-part of application No. 08/614,587, Mar. 13, 1996, Pat. No. 5,725,646.

[51] Int. Cl.[6] .......................... C09D 11/08; C09D 11/10; C09D 11/14
[52] U.S. Cl. ..................................... 106/31.73; 106/31.69; 106/31.75
[58] Field of Search ............................... 106/31.6, 31.73, 106/31.69, 31.75

[56] References Cited

U.S. PATENT DOCUMENTS

| | | | |
|---|---|---|---|
| 3,356,030 | 12/1967 | Greubel | 101/452 |
| 3,877,372 | 4/1975 | Leeds | 101/465 |
| 4,104,219 | 8/1978 | Peters et al. | 260/29.6 RB |
| 4,173,554 | 11/1979 | Sulzberg | 260/29.2 EP |
| 4,278,467 | 7/1981 | Fadner | 106/2 |
| 4,543,102 | 9/1985 | Defago et al. | 8/471 |
| 4,854,969 | 8/1989 | Bassemir et al. | 106/2 |
| 4,954,556 | 9/1990 | Bull et al. | 524/378 |
| 5,039,339 | 8/1991 | Phan et al. | 428/481 |
| 5,098,478 | 3/1992 | Krishnan et al. | 106/31.86 |
| 5,174,815 | 12/1992 | Kondo et al. | 106/31.6 |
| 5,370,906 | 12/1994 | Dankert | 427/261 |
| 5,389,130 | 2/1995 | Batlaw et al. | 106/31.26 |
| 5,417,749 | 5/1995 | Krishnan et al. | 106/31.26 |
| 5,429,841 | 7/1995 | Batlaw et al. | 106/31.26 |
| 5,573,578 | 11/1996 | Okuda | 106/31.26 |
| 5,725,646 | 3/1998 | Krishnan et al. | 106/31.73 |

FOREIGN PATENT DOCUMENTS

| | | | |
|---|---|---|---|
| 0 473 450 A2 | 8/1991 | European Pat. Off. | C08L 93/04 |
| 41 19 348 Al | 12/1992 | Germany | B41F 7/02 |
| WO 97/33750 | 9/1997 | WIPO | B41D 13/22 |
| WO 97/33757 | 9/1997 | WIPO | B41D 13/22 |

OTHER PUBLICATIONS

R.H. Leach and R.J. Pierce, "The Printing Ink Manual," Fifth Edition (1993), pp. 571–576, no month available.

*Primary Examiner*—Helene Klemanski
*Attorney, Agent, or Firm*—Sidney Persley

[57] ABSTRACT

A single fluid water-based gravure printing ink comprising water; a macromolecular resin binder comprised of resins soluble in water regardless of the pH of the water; resins water soluble at water pH value ranging from 7.5 to 10; and aqueous emulsion resins; pigment; and a hydroxyethyl ethylene urea re-wetting agent.

11 Claims, No Drawings

WATER-BASED GRAVURE PRINTING INK

This application is a Continuation-In-Part of application Ser. No. 08/977,531, filed Nov. 25, 1997, now abandoned which is a Continuation-In-Part of application Ser. No. 08/614,587, filed Mar. 13, 1996, now U.S. Pat. No. 5,725,646.

FIELD OF THE INVENTION

The invention relates to water-based gravure printing ink.

DESCRIPTION OF RELATED ART

In an attempt to eliminate volatile organic compounds (VOCs in the pressroom, water-based alternatives are being sought for printing ink formulations. Water-based printing inks for use in flexographic printing processes are known. This type of printing utilizes printing plates wherein the printing images stand up in relief, i.e. the areas to be printed are raised above the non-printing areas. Printing by the flexographic process requires relatively low pressures sufficient to transfer the ink from the face of the image carrier to the surface of the substrate. Examples of useful water-based flexographic printing ink are described in U.S. Pat. No. 4,173,554 and *The Printing Ink Manual,* edited by R. H. Leach and R. J. Pierce, pages 571–576, 5th edition, (Blueprint, 1993).

Water-based gravure printing processes have also been developed to avoid the environmental impact and operating expenses associated with the use of solvents. For example, U.S. Pat. No. 4,104,219 discloses an ink containing a polyalkyl acrylate binder dispersed in a homogenous, aqueous phase. U.S. Pat. No. 4,543,102, describes a water-based ink composition containing up to 8% of a water miscible organic solvent such as polyvinyl alcohol. Water-based gravure printing ink formulations are described in U.S. Pat. Nos. 5,098,478; 4,954,556 and 5,389,130 wherein a substantial portion of solvent is replaced with water.

The solvent used in gravure ink is a temporary ingredient, present purely as a means of applying the vehicle solids to the substrate by way of the printing unit. In theory, once the vehicle solids are applied, the solvent is eliminated, mainly by evaporation and/or absorption and takes no further part in the properties of the printed film on the substrate. However, in practice this is an over simplification since the solvent cannot always be eliminated easily and is sometimes trapped in the lattices of the substrate.

In gravure printing solvent selection is typically governed by the resin system employed; the press speed; whether a direct or off-set gravure process will be used; the design of the gravure cylinder; the substrate; the desired end-use properties of the print; and the pigment selected. However, the chemical nature of the resin system will, more often than not, severely restrict the choice of solvents. With most resins, a blend of solvents will give a lower ink viscosity than a single solvent. An incorrect selection will produce a gravure ink having poor flow characteristics.

A gravure ink must remain fluid during the printing process while the ink flows from the gravure cells onto the substrate. The solvent is then rapidly removed within the drying cycle. Hence, the evaporation rate of the solvent must be geared to the length of time required to remove the excess ink by the doctor blade and the elimination point of the solvent. This time span is clearly governed by press speed. In recent years, changes made to reduce the maximum concentration of solvent vapors allowable in the pressroom atmosphere have resulted in the virtual elimination of solvents such as 2-ethyloxyethanol and the corresponding acetate. These have been replaced with glycol ethers and esters and solvents based on propylene glycol. The most common solvents used in gravure ink formulations include ethyl, iso-propyl and n-propyl alcohols, acetone, ethyl, iso-propyl and n-propyl acetates, methoxy and ethoxy propanols, aliphatic hydrocarbons, toluene, aliphatic hydrocarbon solvents, primarily aromatic, aliphatic and naphthenic hydrocarbons, alcohols, ketones, esters, ethers and halogenated compounds.

Since the solvent component typically constitutes from 30 to 70 wt. % of the gravure ink composition, the emission of volatile organic compounds (VOCs) represents a significant environmental concern. In order to comply with a myriad federal, state and local environmental regulations, gravure printers are been required to install solvent recovery systems which represent both a substantial capital outlay and operating expense and a limit on production rates.

There are a number of other drawbacks associated with the water-base gravure inks of the prior art. For example, the press handling characteristics of these water-base inks are uniquely different from organic solvent base materials. Once dry, aqueous based inks may be reluctant to redissolve in water, depending upon the kind of resin system used in the ink. This could result in an increase in cylinder plugging and number of press wash-ups. Conversely, the resin system may not be sufficiently water resistant upon drying causing the ink to be easily smeared in the presence of moisture. The resin system used in water-based inks can give rise to poor dot spread and increased skipped dots. These problems may be difficult to overcome given the limited availability of resins for use in water-based systems. Accordingly, the adoption of a water-based systems may require changes in gravure cylinder engravings, press operating and housekeeping procedures, higher press speeds, and dryer modifications. Furthermore, the substrate being printed upon may strongly affect the performance of these water-based inks. In applications such as printing on low surface tension film and publication gravure employing coated paper, organic solvent systems still give superior performance. Even with uncoated paper, water may cause dimensional distortion and curling.

A comparison of the water-based and solvent-based gravure inks in the prior art shows that in a solvent ink system the solvents are balanced so as to be sufficiently non-volatile for minimal evaporation from the time the doctor blade removes the excess ink to the point of impression. After impression, transfer of ink to the substrate, and time to achieve uniform lay, the solvent must evaporate prior to rewind or stacking. By comparison, in the water-based ink system of the prior art a percentage of the solvent is replaced not just by water (which acts as the solvent) but also by a volatile amine required to neutralize the acidic resin. Water, while being non-volatile and not causing problems due to evaporation from the cell, can still create difficulties at the final drying stage dependent on the amount of water present in the ink. Also, the selection of amine and control of pH is as important as viscosity control. Premature release of the amine before the point of impression can result in a drop in pH and subsequent precipitation of the resin in the cells of the gravure cylinder. Furthermore, water-based systems are not as readily resolubilized as solvent systems. It is therefore possible that any precipitation will not be resolubilized within the next revolution of the cylinder in the ink duct. Therefore unless carefully controlled, fluctuations in pH can lead to packing in the etch of the gravure cylinder and ultimately to screening. The surface tension characteristics of the water-based system must also be considered since generally they are totally different from those of solvent systems. These differences can lead to poor substrate wetting which results in ink reticulation, crawling, and non-uniform ink flow from the cells. Surface tension can be reduced, however, by careful selection of surface active agents or the inclusion of small quantities of alcohol.

Despite extensive work in development of water-base gravure printing ink formulations, there remains a strong need in the gravure printing industry for an ink completely free of VOCs, while retaining the performance standards of conventional solvent-based gravure inks.

A solvent-free water-based gravure printing ink would eliminate the VOCs commonly emanating from solvent based printing inks.

Therefore, it is an object of the present invention to provide a solvent-free gravure printing ink having no VOC emissions while preserving the principal advantages of conventional solvent-based gravure printing inks.

Another object of the invention is to provide a gravure ink suitable for use in a gravure printing process and compatible with a wide variety of substrates.

Another object of the invention is to provide a gravure ink which retains the performance characteristics of conventional solvent-based ink formulations and is compatible with the standard pigments and resin systems used in gravure printing.

A further object of the present invention is to provide a more economical gravure ink from a raw material and emission control cost standpoint.

Such objectives have been achieved by means of the present invention.

SUMMARY OF THE INVENTION

The present invention is a solvent free, water-based, single fluid gravure printing ink comprising (a) water; (b) a macromolecular resin binder comprised of (i) binders soluble in water regardless of the pH of the water, (ii) rosin salt binders soluble in water at a pH ranging from about 7.5 to about 10, and (iii) aqueous emulsions binders; (c) pigment; and (d) a hydroxyethyl ethylene urea re-wetting agent.

According to the present invention, VOC emissions of gravure inks are reduced by 100% relative to standard solvent based and water-based gravure printing inks while the rigid requirements of gravure printing, e.g., tone scale density, gloss, rub resistance, viscosity and adhesion continue to be met.

DESCRIPTION OF THE INVENTION

Currently, the ink system for surface packaging gravure is rich in VOC's. Nevertheless, chronic problems like hazing and resolubility were reported. Several waterbased formulations have been attempted to replace the existing system, but to no avail. Gloss and open-time appeared to be the major drawbacks.

The advent of 2-hydroxyethylethylene urea have allowed the aforementioned problems to be overcome. For example, adding only 0.5 wt. % 2-hydroxyethylethylene urea overcomes the problems existing with prior art formulations and increases gloss from 6 to 9 points. Improved resolubility and open-time were also acheived using the solvent-free and highly water washable gravure printing inks of the present invention that contain 2-hydroxyethylethylene urea.

In its broadest sense, the gravure printing ink composition of the present invention is made up of a pigment and a vehicle. The vehicle is a liquid carrier, which may be an emulsion. In the present invention the vehicle is water which replaces the volatile organic compound vehicle thereby eliminating VOC emissions. The vehicle also contains binder resins which adhere the pigment to the substrate being printed. It has been surprisingly found that the performance of the gravure printing ink is not appreciably affected by the complete elimination of solvent.

Many resin binder systems require the addition of chemical plasticizers, in order to prevent ink drying in the cells of the gravure cylinder on the press and to ensure satisfactory adhesion and flexibility on the substrate. Water-based systems of the prior art will also contain resins which can be saponified, but must be sufficiently volatile to leave a water-insoluble dried ink film. They will also contain additives to reduce surface tension properties and so enhance lay characteristics. The surface characteristics can be considerably modified by additives which promote rub resistance and slip.

The following resins and mixtures may be incorporated into the gravure ink of the present invention: rosin and modified rosins, such as calcium, magnesium and zinc metallic resinates; ester gum of rosin; maleic resins and esters; dimerized and polymerized rosins; rosin modified fumaric resins; shellac; asphalts; phenolic resins and rosin-modified phenolic resins; alkyd resins; polystyrene resins and copolymers thereof; terpene alkylated urea formaldehyde resins; alkylated urea formaldehyde resins; polyamide vinyl resins, such as polyurethane resins; polyimide resins; polyvinyl acetate and polyvinyl alcohol; ketone resins; acrylic resins, such as polyacrylic acid and polymethacrylic acid; epoxide resins; polyurethane resins; cellulosic resins, such as nitro- and ethyl-cellulose, ethyl cellulose, cellulose acetate butyrate and carboxymethyl cellulose.

The resin may be soluble or dispersible in either the water or aqueous emulsion, depending on the resins hydrophobic/hydrophilic character. In a preferred embodiment, the resin is soluble in the water. The resin binder may be emulsified by mechanical energy being imparted by, for example, pumping the components together in the ink reservoir of a standard gravure printing press. Emulsifiers, such as surfactants, may be added to increase the stability of the emulsion. Generally, the emulsion will remain stable during printing by circulation of the ink in the printing well.

It is unusual to find a resin that will impart all the desired properties to a gravure ink. Therefore, a formulator will select two or possibly three resins to achieve a resin combination giving the required ink characteristics which include: adequate adhesion to the substrate; good solubility in the water; combination release properties with the ability to dry and give tack-free ink films; capability of providing the necessary level of gloss; good pigment-wetting properties; toughness; adequate rub resistance; and flexibility, to ensure non-cracking of the final printed product.

Examples of suitable macromolecular resin binders which are soluble in the water regardless of the pH of the water include: carboxymethyl-cellulose, hydroxyethylcellulose, hydroxypropyl-cellulose, hydroxybutylmethylcellulose, poly($C_1$–$C_4$) alkylene oxides, polyethyleneimine, polyvinyl alcohol, polyvinyl acetate, polyvinylpyrollidone, polyvinyloxazolidone and polyacrylamide polymers.

Preferably, the macromolecular resin rosin salt binders present in the ink are only those which are soluble in the water at pH value ranging from about 7.5 to about 10 and more preferably from about 2.5 to about 6.5 pH. Suitable examples of such binders include methacrylic resin rosin salts; styrene-acrylic resin rosin salts; resin rosin salts; and polystyrene-sulfonic acid resin rosin salts.

Ammonia, organic amines such as monoethanolamine or N,N-diethanolamine, mineral acid and organic acid such as acetic acid may be added to the water in order to adjust its pH in the preferred range.

Suitable examples of the macromolecular resin binders comprising aqueous emulsions include acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

The pigment, as in all colored gravure inks, is the most expensive part of the formulation. Therefore, the economics of pigment selection is vitally important. In many areas of gravure printing, pigments need specific properties to meet the demands made on them during the printing process and in the end use of the printed material, e.g. printing of polyvinyl chloride wallcoverings, deep-freeze polyethylene bags. The normal practice is to have a preferred standard range of pigments against which alternatives can be assessed. In addition, consideration should be given to the pigment's tinctorial strength, ease of dispersion and gloss characteristics. Where it is envisaged that the pigment will be used in a concentrated base scheme, it must have good flow properties at high pigmentation. In comparison with flexographic, offset and letterpress, printing the gravure process can, when required, deposit fairly heavy film weights of ink, which are governed by depth of engraving on the gravure cylinder and hence the volume of ink held by the cells of the cylinder.

Pigments suitable for formulating the gravure ink of the present invention are selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

Optionally, extenders such as china clay and precipitated calcium carbonate may be used in the gravure ink formulations of the present invention. Extenders help control gloss levels and improve the lay characteristics in ink formulations having high binder/pigment ratios. Due to their low cost, extenders can be used to effectively cheapen the cost of gravure inks. For example, extenders can be used in publication gravure inks to assist tack reduction and control colour strength.

Rewetting agents are also employed in the present gravure ink formulation to reduce screening which occurs when the ink in a cell of a second color combines with the dried ink of a first color. To off-set the effects of screening, a rewetting agent is employed. The rewetting agent suitable for use in the present invention is hydroxyethyl ethylene urea. While not wishing to be bound by theory, it is believed that the hydroxyethyl ethylene urea rewetting agent also serves as a plasticizer by providing surface continuity to the dry film on the substrate.

The water-based gravure ink of the present invention may optionally contain other conventional additives, the effects of which must be evaluated, and if necessary, compensated for in the printing process. These adjuvants will include plasticizers such as sucrose acetate iso-butyrate, triethyl citrate, and epoxidised soy bean oil, and waxes such as polyethylene waxes, halogenated hydrocarbon waxes, fatty acid amides, surfactants, defoaming agents, catalysts, antioxidants, corrosion inhibitors, biocides and deodorants. Ammonia or other volatile amines may also be added in trace amounts to aid in dissolving the resin.

In a particularly preferred embodiment of the present invention, up to 5 wt. % of non-ionic surfactant is used to reduce surface tension and stabilize the pigment resin dispersions. Suitable surfactants include, for example, acetylenic glycols, ethoxylated glycols and sorbitan esters. It is also well known in the art to incorporate miscellaneous additives into the ink composition to enhance performance with regard to gloss, rub resistance, uniform density of the print flexibility and adhesion.

In the gravure ink formulations of the present invention the water is preferably present in an amount of 25 to 60 wt. % of the ink; and more preferably 35 to 50 wt. %. It is also preferred that the macromolecular resin binder be present in an amount of 10 to 70 wt. %; and more preferably 30 to 60 wt. %; and most preferably the macromolecular resin binder is a composite having up to 5 wt. % of a resin binder soluble in water regardless of the pH of the water; and 10 to 70 wt. % of a resin binder soluble in water at a pH ranging from 7.5 to 10; and up to 20 wt. % of an aqueous emulsion resin binder. At press viscosity, the maximum pigmentation for organic pigments typically does not exceed 15 wt. %, more preferably 5–10 wt. % of pigment is used. However, with inorganic pigments such as titanium dioxide, pigment levels as high as 25–35 wt. % are used. Therefore, the pigment is preferably present in an amount of 2 to 35 wt. %. Finally, it is preferred that the hydroxyethyl ethylene urea rewetting agent be used in an amount of 0.5 to 10 wt. %.

The viscosity requirements of gravure inks dramatically distinguish them from paste-like inks, such as lithographic inks. Ink viscosity must be adjusted to meet several critical factors. Too high a viscosity results in an inadequate flow of ink from the cells of the cylinder and causes a phenomenon commonly known as "screening". Too low a viscosity results in a "slur-out" or "halo" occurring on the trailing edge of the print, appearing as a thin film of ink printing beyond the limits of the design. With this in mind, the final strength and shade adjustments to a gravure ink should be made when the proper viscosity and printing speed have been determined. The viscosity of the gravure ink of the present invention will fall between 14 and 90 seconds at 25° C. (measured using a Shell Cup #2) and more preferably is between 16 and 50 seconds at 25° C. The present gravure inks can, however, be used at temperatures of up to 75° C. in this viscosity range.

The gravure ink of the present invention can be printed on a wide range of substrates such as paper, films and foils and can also be used for sheet-fed printing of rigid surfaces such as board. It should be noted, however, that absorbent substrates require lower ink viscosities than non-porous surfaces, in fact some substrates require the addition of retarding solvents to enable an acceptable print to be achieved.

Printing at high speeds demands fast drying gravure inks and hence low viscosities, to enable the ink to flow rapidly out of the cells at the point of impression. Although water-based, the drying speed for the water-based gravure ink of the present invention is surprisingly rapid. It should be borne in mind, however, that the drying rate of a gravure ink will greatly depend on the drying technique employed. For example, slow-speed sheet-fed machines have no drying systems other than cold air blowers. High-speed web machines, on the other hand, may have a sophisticated drying system between each unit providing a high-velocity hot air stream. Steam heated drums are also be used to heat the web while cold chill rollers are used to cool the web on exit.

The following example further illustrates specific aspects of the water-based gravure ink of the present invention and is not intended to limit the scope thereof in any respect and should not be so construed. Throughout this specification, all parts and percentages shown, unless otherwise noted, are by weight.

EXAMPLE 1

A single fluid, water-based gravure ink was prepared from the following components: The water present in the ink was supplied by the water contained in the acrylic resin latex, hydroxypropyl cellulose, hydroxyethyl ethylene urea and maleated rosin ester components.

| Component | Amount (wt. %) |
| --- | --- |
| pigment | 9–10 |
| ammonia | 2–3 |
| water | 55–58 |
| hydroxyethylethylene urea (75% solids in water) | .5–2.3 |
| polyester resin | 7–9 |
| acrylic resin | 24–26 |
| ethylene glycol surfactant | 1.2–2.3 |
| Total | 100.00 |

EXAMPLE 2

A single fluid, water-based red gravure printing ink was prepared from the following formulation:

| Component | Amount (wt. %) |
| --- | --- |
| Pigment Red 57:2 | 9–10 |
| polyester resin (Trigloss RD 0110)[a] | 7–9 |
| acrylic resin (Johncryl 68)[b] | 24.5–26.0 |
| ethylene gylcol surfactant (Surfynol 420)[c] | 1.2–2.3 |
| aqueous ammonia | 2.0–3.0 |
| water | 55–58 |
| hydroxyethylethylene urea (SR-511)[d] | 0.5–2.3 |
| Total | 100.00 |

[a]Trigloss is a trademark of R&A Auxiliaries.
[b]Joncryl ® 68 is a trademark of S.C. Johnson Corp.
[c]Surfynol ® 420 is a trademark of the Air Products Corp.
[d]SR-511 is a trademark of the Sartomer Corp.

EXAMPLE 3

A printed coated paper sample containing an ink formulated according to Example 1 was produced on a Chestnut gravure printing press at a print speed of approximately 1,000 feet per minute (fpm) to demonstrate the use of the water-based gravure printing inks of present invention on coated paper. The printing press run was carried out at temperatures ranging from 15–20° C. The print samples obtained from the press run were fast drying, clear and sharp with stable tack. There was no discernible toning in the non-image area. Optical photomicrographs of the print samples showed a smoother surface than print samples printed with gravure inks formulated without hydroxyethylethylene urea. These print samples were brittle and had a more rigid as seen from numerous cracks on the print film surface.

EXAMPLE 4

The single fluid, water-based red gravure printing ink prepared in Example 2 was run at the Chestnut press using a carrier board substrate. The print quality was a better than that of a comparative solvent based ink system and provided 20–25% higher gloss.

EXAMPLE 5

The single fluid, water-based red gravure printing ink prepared in Example 4 was run for "Teabag" printability. The print quality observed was comparable to that of the existing solvent based ink system containing 7–12 wt. % VOC's.

EXAMPLE 6

Single fluid, water-based red and blue gravure printing inks were prepared from the following formulations:

| | Amount (wt. %) | |
| --- | --- | --- |
| Component | Red | Blue |
| blue base (SunChemical 52-1339)[a] | — | 27.0 |
| red base (SunChemical RCD-9017)[a] | 27.0 | — |
| polyester (Trigloss RD0110)[b] | 22.78 | 22.78 |
| acrylic emulsion (Neocryl XA-5048)[c] | 45.55 | 45.55 |
| hydroxyethylethylene urea (SR-511)[d] | 0.51 | 0.51 |
| defoamer (Foamex 805 & 3062, @1:1)[e] | 0.07 | 0.07 |
| ethylene glycol surfactant (Surfonyl 420)[f] | 2.04 | 2.04 |
| acrylic resin (Joncryl 67)[g] | 0.8 | 0.80 |
| water | 2.05 | 2.05 |
| Total | 100.00 | 100.00 |

[a]SunChemical ® is a trademark of the Sun Chemical Corporation.
[b]Trigloss is a trademark of R&A Auxiliaries.
[c]Neocryl ® is a trademark of ICI Industries.
[d]SR-511 is a trademark of the Sartomer Corp.
[e]Foamex 805 & 3062 are trademarks of the Tego Chemie Corp.
[f]Surfynol ® 420 is a trademark of the Air Products Corp.
[g]Joncryl ® 67 is a trademark of the S.C. Johnson Corp.

Both printing inks were run on a Chestnut press using a carrier board substrate. The print quality was better than that of a comparative solvent based ink and provided a 20–25% increase in gloss.

EXAMPLE 7

A color matched single fluid, water-based gravure ink was prepared having the following formulation:

| Component | Amount (wt. %) |
| --- | --- |
| acrylic resin (Vancryl 68SN)[a] | 10.0 |
| water | 13.0 |
| zinc sulfide (sachtolith grade HDS) | 36.5 |
| CaCO$_3$ | 10.0 |
| synthetic silica flattening agent | 2.5 |
| polyethlene wax (AquaPoly 250)[b] | 1.0 |
| polyester varnish (Trigloss Vehicle)[c] | 1.2 |
| acrylic emulsion (Neocryl XA-5048)[d] | 22.5 |
| hydroxyethylethylene urea (SR-511)[e] | 1.0 |
| ethylene glycol surfactant (Surfynol 420)[f] | 1.0 |
| black base (PMA-900)[g] | 0.4 |
| blue base (PMA-525)[g] | 0.3 |
| yellow base (PMA-220)[g] | 0.6 |
| Total | 100.00 |

| Component | Amount (wt. %) |
|---|---|

(a)Vancryl ® 68SN is a trademark of Air Products Corp.
(b)AquaPoly ® 250 is a trademark of Micro Powders, Inc.
(c)Trigloss is a trademark of R&A Auxiliaries.
(d)Neocryl ® is a trademark of ICI Industries.
(e)SR-511 is a trademark of the Sartomer Corp.
(f)Surfynol ® 420 is a trademark of the Air Products Corp.
(g)PMA is a trademark of Sun Chemical Corp.

The ink was printed on the rough side of SBS board (available from James River Corp.) The print quality observed was comparable to a comparative solvent based ink.

EXAMPLE 8

A screen ink system for wallpaper was converted into flexo-gravure application, the blend vehicle was modified with hydroxyethylethylene urea. Four colors of single fluid, water-based gravure inks were prepared having the following formulation:

| Component | Amount (wt. %) | | | |
|---|---|---|---|---|
| | RED | YELLOW | BLUE | BLACK |
| pigment | 10.5 | 13.5 | 13.5 | 12.3 |
| acrylic resin (Joncryl 67)(a) | 1.2 | — | — | — |
| nonionic surfactant | 0.9 | 1.20 | 1.80 | 1.80 |
| cationic surfactant | — | — | — | 0.60 |
| aqueous ammonia | 0.42 | 0.84 | 0.84 | 0.42 |
| water | 38.0 | 35.48 | 34.88 | 35.9 |
| acrylic emulsion (Lucidene 351)(b) | 31.15 | 31.15 | 31.15 | 351 |
| hydroxyethyl ethylene urea (SR-511)(c) | 5.75 | 5.75 | 5.75 | 5.75 |
| ethylene glycol surfactant (Surfynol 420)(d) | 1.03 | 1.03 | 1.03 | 1.03 |
| defoamer (L-493)(e) | 0.20 | 0.20 | 0.20 | 0.20 |
| thickner (RM2020 NPR)(f) | 3.50 | 3.50 | 3.50 | 3.50 |
| silica (LO-VEL 27)(g) | 5.60 | 5.6 | 5.60 | 5.60 |
| hydrocarbon wax (Acumist 12)(h) | 1.75 | 1.75 | 1.75 | 1.75 |
| Total | 100.00 | 100.00 | 100.00 | 100.00 |

(a)Joncryl ® 67 is a trademark of the S.C. Johnson Corp.
(b)Lucidene is a trademark of Mobay Industries.
(c)SR-511 is a trademark of the Sartomer Corp.
(d)Surfynol ® 420 is a trademark of the Air Products Corp.
(e)L493 is a trademark of Drew Chemical.
(f)RM2020 NPR is a trademark of Rohm & Haas Corp.
(g)LO-VEL ® 27 is a trademark of PPG Industries.
(h)Acumist ® is a trademark of Allied Signal Corp.

The present invention has been described in detail, including the preferred embodiments thereof. However, it will be appreciated that those skilled in the art, upon consideration of the present disclosure, may make modifications and/or improvements on the invention that fall within the scope and spirit of this invention as set forth in the following claims.

What is claimed is:

1. A single fluid water-based gravure printing ink comprising:
    (a) water; (b) a macromolecular resin binder that comprises: (i) resins soluble in water regardless of the pH of the water, (ii) resin rosin salts soluble in water at a pH ranging from about 7.5 to about 10, and (iii) of aqueous emulsion resins; (c) pigment; and (d) a hydroxyethylethylene urea re-wetting agent.

2. The ink of claim 1 wherein the water is present in an amount of from 35–50 wt. % based on the weight of the ink.

3. The ink of claim 1 wherein the macromolecular resin binder is present in an amount of from 30–60 wt. % based on the weight of the ink.

4. The ink of claim 1 wherein the macromolecular resin binders soluble in the water regardless of the pH of the water are selected from the group consisting of carboxymethylcellulose, hydroxyethylcellulose, hydroxypropylcellulose, hydroxybutylmethylcellulose, poly($C_1$–$C_4$)alkylene oxides, polyethyleneimine, polyvinyl alcohol, polyvinyl acetate, polyvinyl-pyrollidone, polyvinyloxazolidone and polyacrylamide.

5. The ink of claim 1 wherein the macromolecular resin rosin salt binders soluble in water at a pH of 7.5 to 10 are selected from the group consisting of methacrylic resin rosin salts; styrene-acrylic resin rosin salts; resin rosin salts; and polystyrene-sulfonic acid resin rosin salts.

6. The ink of claim 1 wherein the macromolecular resin binders comprising aqueous emulsions are selected from the group consisting of acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

7. The ink of claim 1 wherein the pigment is present in an amount of from 5–35 wt. % based on the weight of the ink.

8. The ink of claim 1 wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

9. The ink of claim 1 further comprising a non-ionic surfactant.

10. The ink of claim 9 wherein the non-ionic surfactant is present in an amount of up to 5 wt. % based on the weight of the ink.

11. The ink of claim 9 wherein the non-ionic surfactant is selected from the group consisting of acetylenic glycols, ethoxylated glycols and sorbitan esters.

* * * * *